US005470481A

United States Patent [19]
Modell et al.

[11] Patent Number: 5,470,481
[45] Date of Patent: Nov. 28, 1995

[54] METHOD AND APPARATUS FOR RECOVERING WASH WATER FROM PULP AND PAPER MILL EFFLUENT

[75] Inventors: Michael Modell, Cambridge, Mass.; Edward G. Hauptmann, West Vancouver; Stuart A. Gairns, Burnaby, both of Canada

[73] Assignee: Modell Environmental Corporation, Waltham, Mass.

[21] Appl. No.: 135,913

[22] Filed: Oct. 13, 1993

[51] Int. Cl.⁶ .................................................... B01D 61/00
[52] U.S. Cl. ........................ 210/652; 210/650; 210/651; 210/175; 210/180; 210/770; 210/774; 210/257.2; 162/29; 162/261
[58] Field of Search .................. 210/650, 652, 210/175, 180, 770, 774, 195.2, 759, 695, 761, 257.2, 651; 162/29, 57, 189, 190, 9, 261

[56] References Cited

U.S. PATENT DOCUMENTS

| | | | |
|---|---|---|---|
| 3,627,679 | 12/1971 | Fuller | 162/29 |
| 3,639,206 | 2/1972 | Spruill | 162/29 |
| 3,876,497 | 4/1975 | Hoffman | 162/189 |
| 3,876,536 | 4/1975 | Pradt et al. | |
| 3,977,966 | 8/1976 | Pradt et al. | |
| 4,100,730 | 7/1978 | Pradt | 60/39.05 |
| 4,113,446 | 9/1978 | Modell et al. | 48/202 |
| 4,141,829 | 2/1979 | Thiel et al. | 210/63 |
| 4,155,845 | 5/1979 | Ancelle et al. | 210/650 |
| 4,174,280 | 11/1979 | Pradt et al. | |
| 4,241,722 | 12/1980 | Dickinson | 126/260 |
| 4,292,953 | 8/1981 | Dickinson | 110/347 |
| 4,338,199 | 7/1982 | Modell | 210/721 |
| 4,543,190 | 9/1985 | Modell | 210/721 |
| 4,564,458 | 1/1986 | Burleson | 210/747 |
| 4,692,252 | 9/1987 | Atwood et al. | 210/761 |
| 4,713,177 | 12/1987 | Atwood et al. | 210/697 |
| 4,822,497 | 4/1989 | Hong et al. | 210/721 |
| 4,869,833 | 9/1989 | Binning et al. | 210/761 |
| 5,075,017 | 12/1991 | Hossain et al. | 210/761 |
| 5,100,560 | 3/1992 | Huang | 210/721 |
| 5,106,513 | 4/1992 | Hong | 210/759 |
| 5,133,877 | 7/1992 | Rofer et al. | 210/761 |
| 5,252,224 | 10/1993 | Modell et al. | 210/695 |
| 5,296,099 | 3/1994 | Griggs et al. | 162/57 |
| B1 4,338,199 | 11/1988 | Modell | 210/721 |

FOREIGN PATENT DOCUMENTS

| | | |
|---|---|---|
| 048047A1 | 4/1992 | European Pat. Off. . |
| 57-071690 | 5/1982 | Japan . |
| 2171788 | 7/1987 | Japan .................... 210/651 |
| 81/03169 | 11/1981 | WIPO . |

OTHER PUBLICATIONS

Bramlette, et al., *Sandia Report* (SAND90–8229), "Destruction of DOE/DP Surrogate Wastes with Supercritical Water Oxidation Technology," (Nov. 1990).

Ermolaev, N. P., et al., "Pipe Inner Surface Scale Sample Remover—has Washing Soln. Vessel Connected to Shaft with Brush, by Flexible Pipeline," (From *Derwent Publications, Ltd.*, London, GB, Week 8350, Section EI, Feb. 25, 1983, Abstract SU-996908).

*Primary Examiner*—Ana M. Fortuna
*Attorney, Agent, or Firm*—Hamilton, Brook, Smith & Reynolds

[57] ABSTRACT

A method and apparatus for recovering wash water from effluent generated by a pulp and paper mill. The method includes filtering at least a portion of the effluent to form a filtrate stream and an organic solids feed stream. The organic solids feed stream is exposed to a temperature and a pressure which are supercritical for water to cause a substantial portion of the organic component to oxidize and form a product stream that, when cooled, includes a gaseous component, an inorganic solids component, and a liquid wash water component. The wash water component is separated from the gaseous and inorganic solids components, thereby recovering wash water.

20 Claims, 8 Drawing Sheets

METHOD AND APPARATUS FOR RECOVERING WASH WATER FROM PULP AND PAPER MILL EFFLUENT

BACKGROUND OF THE INVENTION

Pulp and paper mills are under increased pressure to reduce both the quantity of water intake and the quantity of aqueous effluent discharged into the environment. The amount of water throughput has been significantly reduced in modern mills by employing a variety of techniques, such as countercurrent washing techniques for bleaching and utilization of stripped foul condensate from black liquor evaporators.

However, water discharged from pulp and paper mills typically includes elevated organic loads and a variety of other contaminants, such as color, fabric, and inorganic toxins. A number of methods have been employed to diminish the BOD (biological oxygen demand), COD (chemical oxygen demand), color, and solids content of effluent streams. Nevertheless, each of these methods has shortcomings, even when employed in combination with each other. For example, the color content of effluents has been significantly reduced by the addition of oxygen, or hydrogen peroxide in combination with oxygen. However, these treatments do not substantially change the BOD and COD of the effluent. In another example, clarifiers, or sedimentation tanks, have been employed to remove large amounts of solids from aqueous effluents. However, such facilities are subject to spillage and upsets which can cause the clarity of treated effluent to be significantly diminished.

Ultrafiltration and reverse osmosis have been shown to be effective in concentrating bleach plant effluents and in producing filtrates that are suitable for reuse in pulp and paper mills as clean wash water. However, these methods of filtration typically produce a concentrate of organic solids which have a high BOD and include toxic inorganic and organic components.

Therefore, a need exists for a method and system which overcomes or minimizes the above-mentioned problems.

SUMMARY OF THE INVENTION

The present invention relates to a method and apparatus for recovering wash water from effluent generated by a pulp and paper mill.

The method includes filtering at least a portion of the effluent to form a filtrate stream and an organic solids feed stream. The organic solids feed stream is exposed to a temperature and a pressure which are supercritical for water to cause a substantial portion of an organic solids component of said feed stream to oxidize and form a product stream that, when cooled, includes a gaseous component, an inorganic solids component, and a liquid wash water component. The liquid wash water component is separated from the gaseous and inorganic solid components, thereby recovering the wash water.

The apparatus includes a filtration means for filtering at least a portion of the effluent to form a filtrate stream and organic solids feed stream. A reactor receives the organic solids feed stream from the filtration means and exposes the feed stream to a temperature and pressure which are supercritical for water, whereby a substantial portion of an organic solids component of said feed stream is oxidized to form a product stream that includes a gaseous component, an inorganic solids component, and a liquid wash water component. Separating means separate the wash water component from the gaseous and inorganic solids components to thereby recover the wash water.

This invention has many advantages. For example, the BOD and COD of effluents generated by pulp and paper mills is significantly reduced. Further, color content and fiber content of such streams are also significantly reduced. Also, the volume of water consumed during processing in a pulp and paper mill is substantially reduced because most of the water discharged as effluent is recovered and is suitable for recycling to pulp and paper mill processing steps. Essentially all organic and toxic components of effluent are converted to substantially inert or non-toxic solids from which residual water is easily removed. The volume of solids discharged from pulp and paper mills is also significantly reduced.

DETAILED DESCRIPTION OF THE INVENTION

The above features and other details of the method and apparatus of the invention will now be more particularly described with reference to the accompanying drawings and pointed out in the claims. The same number in different figures represents the same apparatus. It will be understood that the particular embodiments of the invention are shown by way of illustration and not as limitations of the invention. The principle features of this invention can be employed in various embodiments without departing from the scope of the invention.

Figure 1:
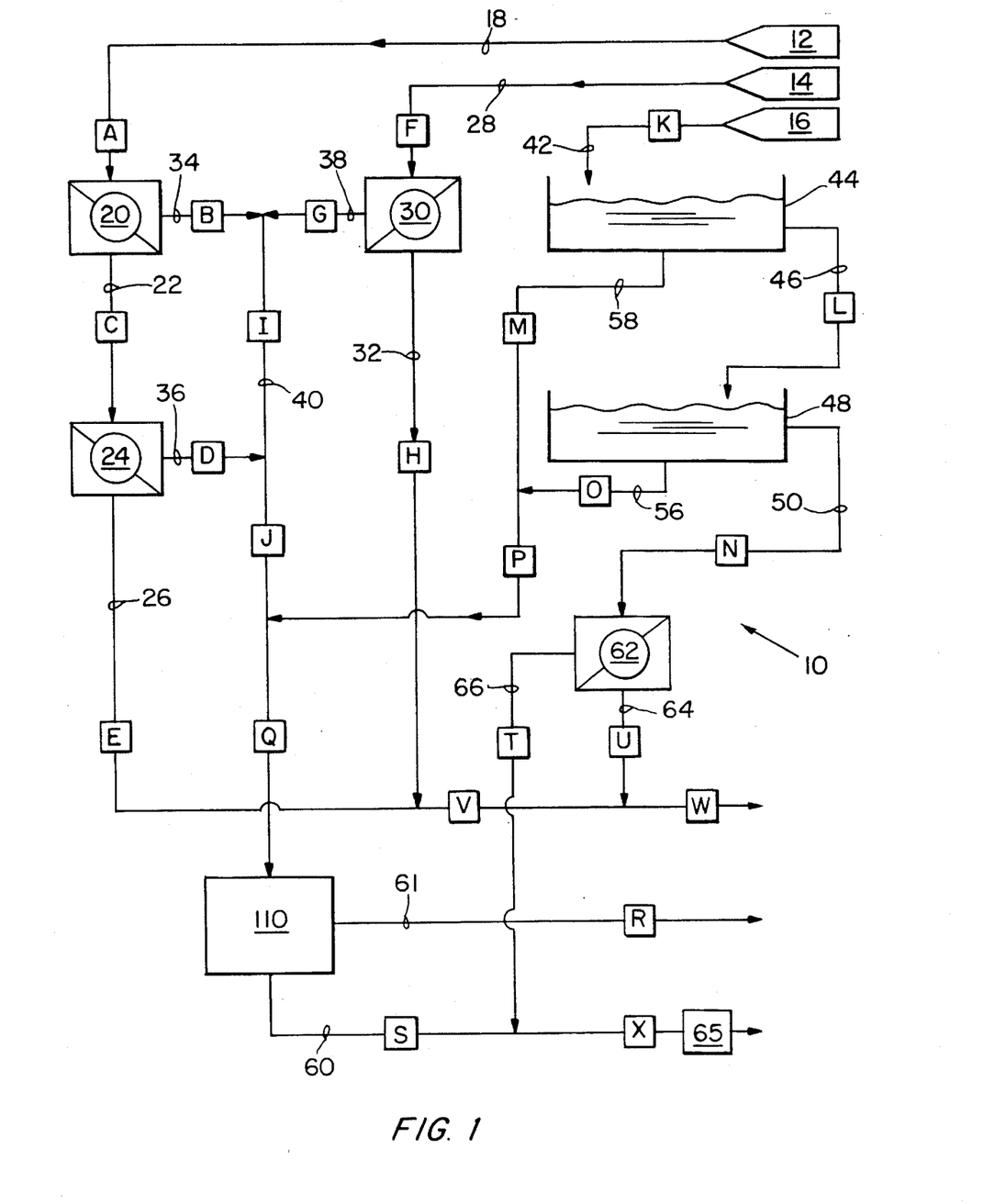
FIG. 1 is a schematic representation of one embodiment of an apparatus of the invention.

Apparatus 10, as shown in FIG. 1, includes three general sources of pulp and paper mill effluent. These sources include caustic extraction effluent source 12, bleaching effluent source 14, and miscellaneous source 16. Miscellaneous source 16 usually includes pump seal water and water generated by other activities, such as water employed for wire cleaning on the pulp and paper machines, and water used to wash down floors. Typical compositions of the caustic extraction and bleached effluent streams generated by these sources are shown below in Table I.

TABLE I

Typical Compositions of Caustic Extraction and Bleaching and Effluents

| Stream | | Caustic Extraction Effluent | Bleaching Effluent | Total |
|---|---|---|---|---|
| BOD | (kg/odt) | 13.5 | 5.6 | 19.1 |
| COD | (kg/odt) | 63.0 | 13.1 | 76.1 |
| Colour | (kg/odt as Pt) | 332.8 | 17.8 | 350.6 |
| Total Solids | (kg/odt) | 116.3 | 48.0 | 164.3 |
| Organics | (kg/odt) | 39.9 | 7.7 | 47.6 |
| $CL^-$ | (kg/odt) | 31.7 | 21.6 | 53.3 |
| Organic Cl | (kg/odt) | 4.2 | 1.6 | 5.8 |
| $Na^+$ | (kg/odt) | 30.7 | 13.5 | 44.2 |
| RFA (resin and fatty acids) | (g/odt) | 104.6 | — | — |

Table I also indicates BOD and COD which are typical of these streams.

Figure 2:
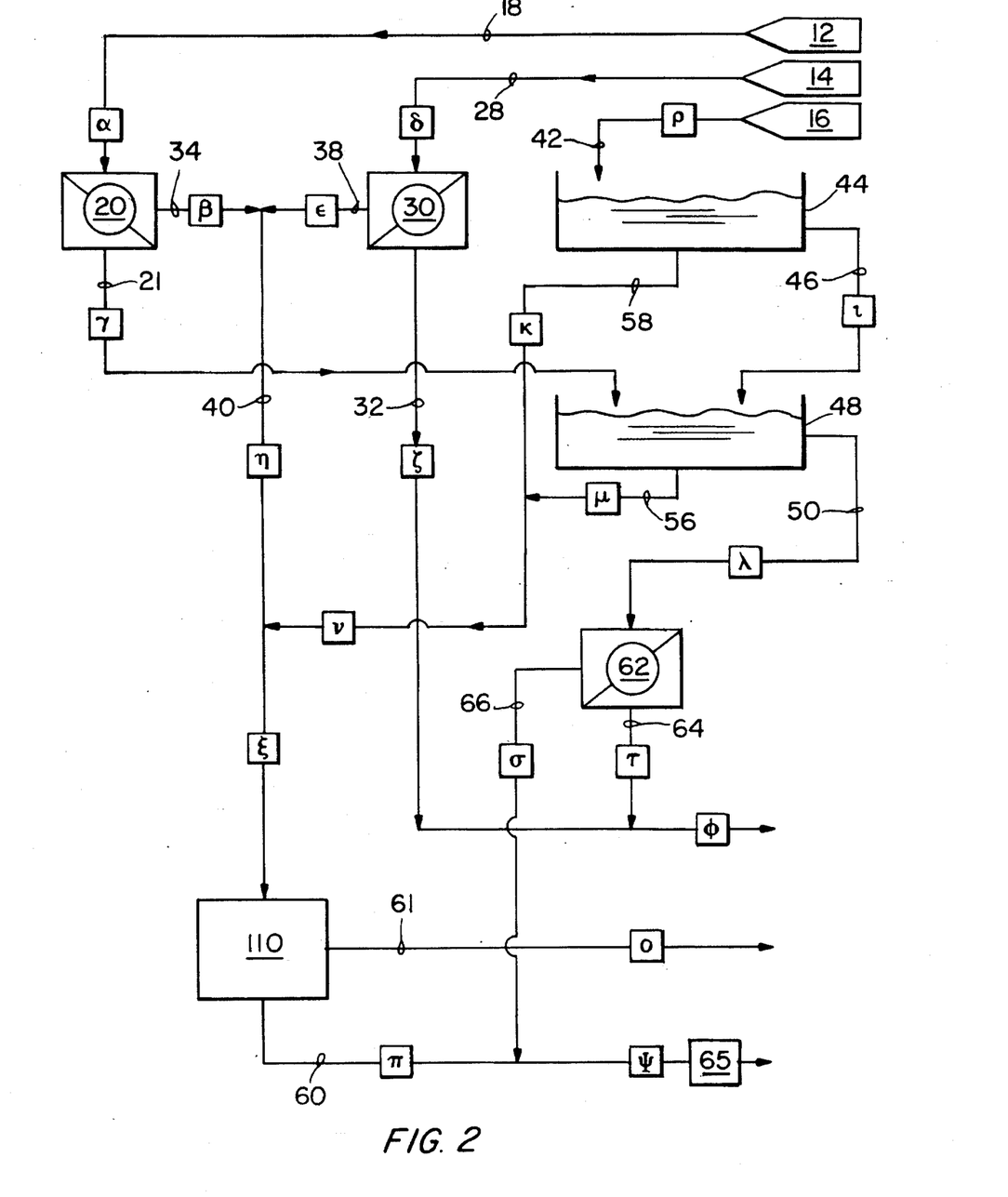
FIG. 2 is a schematic representation of an alternate embodiment of an apparatus of the invention.

Caustic extraction effluent is directed from caustic-extraction effluent source 12 through line 18 to ultrafiltration unit 20. An example of a suitable ultrafiltration unit is A one-stage ultrafiltration unit. Filtrate generated by ultrafiltration unit 20 is directed from ultrafiltration unit 20 through line 22 to reverse osmosis unit 24 for further refinement. An example of a suitable reverse osmosis unit is a three-stage osmosis unit. Filtrate generated by reverse osmosis unit 24 is directed from reverse osmosis unit 24 through line 26 for reuse as wash water in a pulp and paper mill. Alternatively, as shown in FIG. 2, filtrate from ultrafiltration unit 20 can be directed through line 21 to activated sludge treatment vessel 48.

Returning to FIG. 1, bleaching effluent is directed from bleaching effluent source 14 through line 28 to reverse osmosis unit 30. An example of a suitable reverse osmosis unit is a three-stage reverse osmosis unit. Filtrate generated by reverse osmosis unit 30 is directed from reverse osmosis unit 30 through line 32 for reuse in a pulp and paper mill as wash water, such as by directing the filtrate from line 32 to line 26.

Ultrafiltration unit 20, reverse osmosis unit 24, and reverse osmosis unit 30 are all means for filtering caustic extraction and bleaching effluents generated by a pulp and paper mill. Although an ultrafiltration unit and reverse osmosis units are shown in FIGS. 1 and 2, other filtration means, including other types of membrane filtration units, can be employed as alternative means for filtering the caustic extraction and bleaching effluents. A general discussion of suitable reverse osmosis and ultrafiltration units is described in Dorica et al., *TAPPI Proc.*, 1985 *Pulping Conf.*, pg 587–599 (1985), the teachings of which are incorporated by reference.

Concentrates generated by ultrafiltration unit 20, reverse osmosis unit 30, and reverse osmosis unit 24, typically include organic solids and toxic components, in addition to water. The concentrates from ultrafiltration unit 20, reverse osmosis unit 24 and reverse osmosis unit 30 are directed from these filtration units through lines 34, 36 and 38, respectively, to line 40. Line 40 extends to supercritical water oxidation unit 110. In one embodiment, the concentrates can be dewatered, if necessary, by a suitable means, not shown.

Miscellaneous effluents are directed from miscellaneous effluent source 16 through line 42 to primary settlement vessel 44. The contents of primary settlement vessel 44 are substantially quiescent, allowing clarification of the liquid component of the miscellaneous effluent, and concentration of solids, such as organic solids, in the miscellaneous effluent. In one embodiment, clarified liquid is directed from primary settlement vessel 44 through line 46 to activated sludge treatment vessel 48. The biological oxygen demand of the effluent component directed through activated sludge treatment vessel 48 is substantially reduced therein. A clarified liquid stream is generated in activated sludge treatment vessel 48 which is suitable for filtration by reverse osmosis. The clarified liquid is directed from activated sludge treatment vessel 48 through line 50 to reverse osmosis unit 62. The clarified liquid is filtered in reverse osmosis unit 62. Filtrate from reverse osmosis unit 62 is directed through line 64 to line 40 for reuse as wash water in a pulp and paper mill. Concentrate collected in reverse osmosis unit is directed through line 66 to line 60 for suitable disposal. Treated sludge in activated sludge treatment vessel 48 is directed from activated sludge treatment vessel 48 through line 56 to line 58.

Sludge is also generated in primary settlement vessel 44 and is directed from primary settlement vessel 44 through line 58 to line 40 for combination with concentrates generated by the filtration units and direction to supercritical water oxidation unit 110. Sludge generated by activated sludge treatment vessel 48 is combined with sludge generated by primary settlement vessel 44 in line 58. Optionally, either or both of these sludges generated by primary settlement vessel 44 and activated sludge treatment vessel 48 can be dewatered by a suitable means (not shown). These sludges generally include an organic component and at least one toxic component. The concentrates and the sludges are combined in line 40 to form a feed stream which is suitable for treatment by exposure to a temperature and a pressure which are supercritical for water.

The feed stream is directed from line 40 through supercritical water oxidation unit 110. The feed stream is exposed in supercritical water oxidation unit 110 to a temperature and a pressure which are supercritical for water, and which cause a substantial portion of the organic component of the feed mixture to oxidize. The reaction mixture is then cooled to a temperature which causes formation of gas and liquid phases. The liquid phase includes solid particles. The liquid and gas phases are separated, as is a substantial portion of the liquid component of the liquid phase from the solid particles. The solid particles are essentially inorganic and nontoxic, and they can be sent to a landfill or otherwise suitably disposed of through line 61.

The liquid component of the liquid phase is substantially water and dissolved salts. This liquid stream is directed from supercritical water oxidation unit 110 through line 60 for suitable disposal or reuse in a pulp and paper mill as wash water. The liquid stream can subsequently be filtered by directing it through reverse osmosis unit 65 at line 60. Concentrates collected in reverse osmosis unit 62 are directed through line 66 for combination with the liquid stream from supercritical water oxidation unit 110. Alternatively, unit 65 can be a suitable apparatus specifically designated for desalination of wash water, such as a suitable evaporation unit. An example of suitable disposal treatment of the combined liquid steams is evaporation of the water content and disposal of the resulting dried solids (i.e., salts) in a landfill or by deep well disposal. The evaporated water can then be condensed for reuse as wash water in a pulp and paper mill.

An example of a material balance through the arrangement of apparatus represented in FIG. 1 is listed below in Table II. Each stream in Table II is characterized by a boxed upper-case letter shown in FIG. 1. In addition, an example of a material balance through the arrangement of apparatus represented in FIG. 2 is listed below in Table III, wherein each stream in Table III is characterized by a boxed lower-case Greek letter shown in FIG. 2.

TABLE II

PULP AND PAPER MILL WASTEWATER TREATMENT
MASS BALANCE FOR COMBINED SCWO, UF, AND RO FOR FIG. 1

| Stream | | A | B | C | D | E | F | G | H | I | J | K | L |
|---|---|---|---|---|---|---|---|---|---|---|---|---|---|
| Flow | m^3/odt | 10.30 | 0.62 | 9.68 | 2.42 | 7.26 | 5.50 | 0.83 | 4.68 | 1.44 | 3.86 | 8.30 | 8.13 |
| BOD | kg/odt | 13.50 | 6.08 | 7.43 | 6.31 | 1.11 | 5.60 | 4.14 | 1.46 | 10.22 | 16.53 | 6.89 | 6.75 |
| COD | kg/odt | 63.00 | 41.58 | 21.42 | 19.06 | 2.36 | 13.10 | 9.69 | 3.41 | 51.27 | 70.34 | | |
| Color | kg/odt | 332.80 | 289.54 | 43.26 | 43.22 | 0.04 | 17.80 | 17.69 | 0.11 | 307.23 | 350.45 | | |
| Total Solids | kg/odt | 116.30 | 38.38 | 77.92 | 76.05 | 1.87 | 48.00 | 47.09 | 0.91 | 85.47 | 161.52 | | |
| Dissolved Organics | kg/odt | 39.90 | 26.33 | 13.57 | 13.16 | 0.41 | 7.70 | 7.36 | 0.34 | 39.7 | 46.85 | | |
| Organic Cl | kg/odt | 4.20 | 2.73 | 1.47 | 1.46 | 0.01 | 1.60 | 1.60 | 0.00 | 4.33 | 5.79 | | |
| NaCl | kg/odt | 62.40 | 4.63 | 57.77 | 57.04 | 0.73 | 35.13 | 34.68 | 0.45 | 39.31 | 96.35 | | |
| Primary Sludge | kg/odt | | | | | | | | | | | 16.67 | |
| Biological Sludge | kg/odt | | | | | | | | | | | | |
| Ash | kg/odt | | | | | | | | | | | | |

| Stream | | M | N | O | P | Q | R | S | T | U | V | W | X |
|---|---|---|---|---|---|---|---|---|---|---|---|---|---|
| Flow | m^3/odt | 0.17 | 8.04 | 0.10 | 0.26 | 4.13 | 0.01 | 4.14 | 2.01 | 6.03 | 11.94 | 17.96 | 6.14 |
| BOD | kg/odt | 0.14 | 0.33 | 0.00 | 0.15 | 16.68 | | 0.02 | 0.28 | 0.05 | 2.57 | 2.62 | 0.30 |
| COD | kg/odt | | | | | 70.34 | | 0.07 | | | 5.76 | 5.76 | 0.07 |
| Color | kg/odt | | | | | 350.45 | | 0.00 | | | 0.15 | 0.15 | 0 |
| Total Solids | kg/odt | | | | | 182.03 | | 111.65 | | | 2.78 | 2.78 | 111.65 |
| Dissolved Organics | kg/odt | | | | | 46.85 | | 0.06 | | | 0.75 | 0.75 | 0.06 |
| Organic Cl | kg/odt | | | | | 5.79 | | 0.01 | | | 0.01 | 0.01 | 0.01 |
| NaCl | kg/odt | | | | | 96.35 | | 102.13 | | | 1.18 | 1.18 | 102.13 |
| Primary Sludge | kg/odt | 16.67 | | | 16.67 | 16.67 | | 0.00 | | | 0.00 | 0.00 | 0.00 |
| Biological Sludge | kg/odt | | | 3.85 | 3.85 | 3.85 | | 0.00 | | | 0.00 | 0.00 | 0.00 |
| Ash | kg/odt | | | | | | 3.08 | | | | | | |

| | |
|---|---|
| SGR | 0.60 sludge growth rate (kg sludge/kg of BOD reduction) |
| SLDG_O | 0.85 organic fraction of sludge |
| SLDG_A | 0.15 ash fraction of sludge |
| DRE | 99.90% SCWO DRE for organics |
| RED_BOD | 95.00% activated sludge treatment BOD reduction efficiency |
| RED_COLOR | 5.00% activated sludge treatment color reduction efficiency |
| RED_TOX | 60.00% activated sludge treatment organic halide reduction efficiency |
| CON_P | 10.00% consistency of primary sludge |
| CON_B | 4.00% consistency of activated sludge |
| CON_A | 25.00% consistency of SCWO ash |
| PROD_H2O | 0.456 kg of water prod. by oxidation of 1 kg of sludge |

TABLE III

PULP AND PAPER MILL WASTEWATER TREATMENT
MASS BALANCE FOR COMBINED SCWO, UF, AND RO FOR FIG. 2

| Stream | | α | β | γ | δ | ε | ζ | η | ρ | ι | κ |
|---|---|---|---|---|---|---|---|---|---|---|---|
| Flow | m^3/odt | 10.30 | 0.62 | 9.68 | 5.50 | 0.83 | 4.68 | 1.44 | 8.30 | 8.13 | 0.17 |
| BOD | kg/odt | 13.50 | 6.08 | 7.43 | 5.60 | 4.14 | 1.46 | 10.22 | 7.30 | 7.15 | 0.15 |
| COD | kg/odt | 63.00 | 41.58 | 21.42 | 13.10 | 9.69 | 3.41 | 51.27 | | | |
| Color | kg/odt | 332.80 | 289.54 | 43.26 | 17.80 | 17.69 | 0.11 | 307.23 | | | |
| Total Solids | kg/odt | 116.30 | 38.98 | 77.92 | 48.00 | 47.09 | 0.91 | 85.47 | | | |
| Dissolved Organics | kg/odt | 39.90 | 26.33 | 13.57 | 7.70 | 7.36 | 0.34 | 33.70 | | | |
| Organic Cl | kg/odt | 4.20 | 2.73 | 1.47 | 1.60 | 1.60 | 0.00 | 4.33 | | | |
| NaCl | kg/odt | 62.40 | 4.63 | 57.77 | 35.13 | 34.68 | 0.45 | 39.31 | | | |
| Primary Sludge | kg/odt | | | | | | | | 16.67 | | 16.67 |
| Biological Sludge | kg/odt | | | | | | | | | | |
| Ash | kg/odt | | | | | | | | | | |

| Stream | | λ | μ | ν | ξ | o | π | σ | τ | φ | ψ |
|---|---|---|---|---|---|---|---|---|---|---|---|
| Flow | m^3/odt | 17.61 | 0.21 | 0.37 | 1.82 | 0.01 | 1.83 | 4.40 | 13.21 | 17.68 | 6.23 |
| BOD | kg/odt | 0.72 | 0.01 | 0.16 | 10.38 | | 0.01 | 0.61 | 0.11 | 1.56 | 0.62 |
| COD | kg/odt | | | | 51.27 | | 0.05 | | | 3.41 | 0.05 |
| Color | kg/odt | 40.62 | 0.48 | 0.48 | 307.71 | | 0.00 | 40.58 | 0.04 | 0.15 | 40.58 |
| Total Solids | kg/odt | | | | 85.47 | | 23.11 | | | 0.91 | 23.11 |
| Dissolved Organics | kg/odt | | | | 33.70 | | 0.05 | | | 0.34 | 0.05 |
| Organic Cl | kg/odt | 0.58 | 0.01 | 0.01 | 4.33 | | 0.00 | 0.58 | 0.00 | 0.01 | 0.58 |
| NaCl | kg/odt | 57.09 | 0.67 | 0.67 | 39.99 | | 44.32 | 56.38 | 0.72 | 1.17 | 106.69 |

TABLE III-continued

PULP AND PAPER MILL WASTEWATER TREATMENT
MASS BALANCE FOR COMBINED SCWO, UF, AND RO FOR FIG. 2

| | | | | | | | | | | |
|---|---|---|---|---|---|---|---|---|---|---|
| Primary Sludge | kg/odt | | 16.67 | 16.67 | | 0.00 | 0.00 | 0.00 | 0.00 | 0.00 |
| Biological Sludge | kg/odt | 8.31 | 6.31 | 8.31 | | 0.00 | 0.00 | 0.00 | 0.00 | 0.00 |
| Ash | kg/odt | | | | 3.75 | | | | | |

| | | |
|---|---|---|
| SGR | 0.60 | sludge growth rate (kg sludge/kg of BOD reduction) |
| SLDG_O | 0.85 | organic fraction of sludge |
| SLDG_A | 0.15 | ash fraction of sludge |
| DRE | 99.90% | SCWO DRE for organics |
| RED_BOD | 95.00% | activated sludge treatment BOD reduction efficiency |
| RED_COLOR | 5.00% | activated sludge treatment color reduction efficiency |
| RED_TOX | 60.00% | activated sludge treatment organic halide reduction efficiency |
| CON_P | 10.00% | consistency of primary sludge |
| CON_B | 4.00% | consistency of activated sludge |
| CON_A | 25.00% | consistency of SCWO ash |
| PROD_H2O | 0.456 | kg of water prod. by oxidation of 1 kg of sludge |

Examples of suitable supercritical water oxidation units for use in the present invention are described in U.S. Pat. Nos. 5,252,224, 4,543,190, 4,388,199, 4,292,953, 4,241,722, and 4,284,015, the teachings of all of which are incorporated by reference.

Figure 3:
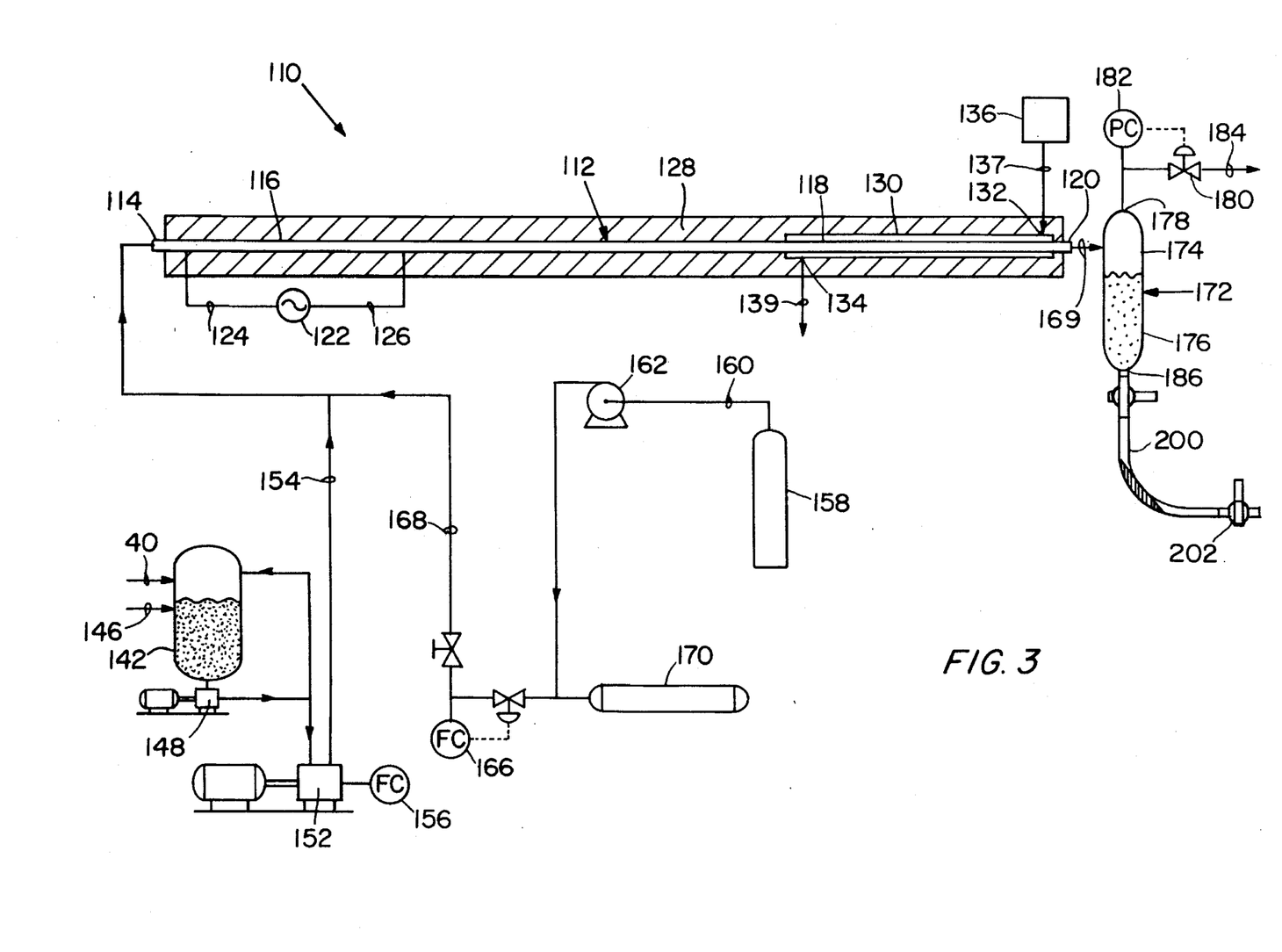
FIG. 3 is a schematic representation of one embodiment of a supercritical water oxidation system suitable for use as a component in the apparatus shown in FIG. 1 and in FIG. 2.

A preferred embodiment of supercritical water oxidation unit 110 is represented in FIG. 3. As shown in FIG. 3, tubular reactor 112 has inlet 114, inlet end 116, outlet end 118 and outlet 120. The internal diameter of tubular reactor 112 is substantially constant throughout its length. Tubular reactor 112 is an elongate tubular reactor. The interior wall of tubular reactor 112 is preferably a continuous smooth surface from inlet 114 to outlet 120.

A feed stream is formed by mixing, and them pressuring, organic materials, inorganic materials, and water to an absolute pressure of greater than about 218 atmospheres. Oxygen is then introduced to the feed stream to form a reaction mixture. The reaction mixture is directed into tubular reactor 112 to cause a substantial portion of the organic material in the reaction mixture to oxidize, whereby lower molecular weight products are formed from the organic material. Solid inorganic salts, carried from the feed stream and also formed during oxidation of organic material, are dissolved in the reaction mixture by cooling the reaction mixture at outlet end 118. An effluent mixture is discharged from tubular reactor 112 and separated into gas, liquid and solid phase components, which components are collected and depressurized.

The reaction mixture is heated by conducting an electrical current through tubular reactor 112 at inlet end 114. The electrical current is generated by electrical power source 122, which is connected to tubular reactor 112 by wires 124, 126. Resistance to conduction of electrical current by tubular reactor 112 generates sufficient heat to heat the reaction mixture at inlet end 114, thereby contributing to elevation of the temperature of the reaction mixture to a supercritical temperature for water. Preferably, the temperature of the reaction mixture is elevated to about above 250° C. It is to be understood that heat generated by exothermic reaction of the reaction mixture with water and oxygen in tubular reactor 112 also contributes to elevation of the temperature in the reaction mixture to a temperature which is supercritical for water.

Tubular reactor 112 can be insulated by thermal insulator 128 to diminish heat loss from within tubular reactor 112 during oxidation. Following oxidation of the organic material, the reaction mixture is cooled at outlet end 116 of tubular reactor 112 by a suitable heat-transfer fluid. Examples of suitable heat-transfer fluids include water, etc. Cooling jacket 130 includes cooling let 132 and cooling outlet 134. A heat-transfer fluid is conducted from heat-transfer fluid source 136 through line 137 and cooling inlet 132 into cooling jacket 130, and is then discharged from cooling jacket 130 through cooling outlet 134 through line 139.

Means for forming a pressurized reaction mixture include formation of a pressurized feed stream and introduction to the pressurized feed stream of a pressurized source of oxygen. The feed stream is formed as discussed above, with reference to FIGS. 1 and 2.

Organic material, inorganic material and water are introduced to feed tank 142 through line 40. The feed stream can be neutralized to a pH of between about six and about ten by suitable means, not shown. Water can be introduced through water line 146 into feed tank 142 for mixture with material from line 40 to obtain a feed stream having a desired heating value. Examples of suitable heating values are in the range of between about 300 and about 2000 Btu/lb. calories per gram. Alternatively, aqueous material which is sufficiently dilute can be received into feed tank 142 without addition of water. Feed stream in feed tank 142 can be recirculated through recirculating pump 148 and recirculation line 150. At least a portion of the feed stream is diverted from recirculation line 150 and is then pressurized by feed pump 152 to an absolute pressure of greater than about 218 atmospheres. Pressurized feed stream is directed through feed line 154 to tubular reactor 112 at inlet end 114 by feed pump 152. The rate of flow of reaction mixture through tubular reactor 112 can be controlled by feed controller 156, which regulates operation of feed pump 152.

Oxygen is introduced to the feed stream by directing flow of oxygen source 158, through oxygen line 160 to booster compressor 162. The source of oxygen can be, for example, compressed air. Oxygen is then pressurized by booster compressor 162 and is directed by booster compressor 162 through oxygen feed line 164, oxygen controller 166 and oxygen feed line 168, and then introduced to the feed stream at feed line 154. Oxygen accumulator 170, at oxygen feed line 154. Oxygen accumulator 170, at oxygen feed line 164, can facilitate control of oxygen feed to the feed to tubular reactor 112. Preferably, the pressure in oxygen accumulator 170 is about one-hundred psi greater than the pressure of reaction mixture at inlet 114 of tubular reactor 112.

Oxygen mixes with the feed stream to thereby form, with the pressurized feed stream, the reaction mixture. It is to be understood, however, that oxygen can be fed to the feed stream through a port, not shown, which can be located at any point along inlet end 116 of tubular reactor 112, to thereby form the reaction mixture. The feed stream can be unheated or partially heated at the point of introduction of oxygen to form the reaction mixture. However, the preferred location of oxygen feed line 168 is at feed line 154, as shown in FIG. 1, whereby oxygen is mixed with the feed stream before introduction of the feed stream to tubular reactor 112.

The pressurized reaction mixture is passed through the tubular reactor 112 by a pressure drop maintained between inlet 114 and outlet 120 of tubular reactor 112. The pressure at inlet 114 is established by the rate of flow of feed materials, as maintained by feed pump 152 and oxygen booster compressor 162. The pressure at outlet 120 is controlled by the rate at which gas, which is generated in tubular reactor 112, is depressurized after discharge from tubular reactor 112.

Means for introducing sufficient heat to the pressurized reaction mixture at inlet end 116 of tubular reactor 112 to cause a substantial portion of the organic material in the reaction mixture to oxidize include, for example, direct ohmic heating of tubular reactor 112 by an electrical current generated by electrical power source 122. Alternatively, other suitable means for heating can be employed, such as a heating jacket and heat transfer fluid, not shown. The reaction mixture is heated within inlet end 116 to elevate the temperature of the reaction mixture and thereby increase the rate of oxidation of the reaction mixture. The organic material is thereby substantially oxidized within tubular reactor 112.

Following oxidation, the reaction mixture within outlet end 116 can include oxygen ($O_2$), carbon dioxide ($CO_2$), nitrogen ($N_2$) and water as a homogenous fluid phase. Solids, such as metal oxides, metal carbonates, and inorganic salts which are substantially insoluble in water at high temperatures, i.e. above about 300° C., can also be included in the reaction mixture after the organic material has been oxidized.

The reaction mixture is then cooled to form an effluent mixture. Means for cooling the reaction mixture at outlet end 116 include a heat-transfer fluid and a cooling jacket 130, through which the heat-transfer fluid is conducted. The heat-transfer fluid is introduced to cooling jacket 130 through cooling inlet 132 and is discharged from cooling jacket 130 through cooling outlet 134. The reaction mixture thereby cools, thus allowing the reaction mixture to form an effluent mixture which includes gas and liquid fluid phases.

As the reaction mixture cools, a substantial portion of solid inorganic salts in the reaction mixture at outlet end 118 can dissolve in the liquid phase of the reaction mixture. Such inorganic salts can include, for example, calcium sulfate, sodium chloride, sodium phosphate, sodium carbonate, sodium sulfate and potassium sulfate.

At outlet 120 of tubular reactor 112, the effluent mixture is a combination of three phases. A first phase is gaseous and typically includes, as major constituents: carbon dioxide ($CO_2$); unreacted oxygen ($O_2$); and, if air is used as the oxidant, nitrogen ($N_2$). Minor constituents of the gaseous phase can include, for example: carbon monoxide (CO) and nitrous oxide ($N_2O$). A second phase is liquid and generally includes water with carbon dioxide and inorganic salts dissolved therein. A third phase includes solid particulates that can include, for example, oxides, carbonates, and other inorganic materials which are water-insoluble.

Upon discharge from outlet 120, the effluent mixture is directed through line 169 to gas/liquid phase separator 172. Gas/liquid phase separator 172 has upper portion 174 and lower portion 176. The gaseous phase and liquid phase of the effluent mixture separate in gas/liquid phase separator 172. The gaseous phase of the effluent mixture is then depressurized to below the critical pressure of water by passage of the gaseous phase through gas outlet 178, which is disposed at upper portion 174 of gas/liquid separator 172, and then through flow control valve 180. Flow control value 180 is controlled by pressure controller 182. The depressurized gaseous phase then leaves reaction system 10 through vent line 84.

The liquid phase and solid particulates of the effluent mixture exit reaction system 110 through bottom outlet 186, which is disposed at lower portion 176 of gas/liquid phase separator 172, and are directed to suitable means for depressurization, such as a back-pressure regulator, or flow control valve, not shown. The liquid phase discharged from gas/liquid phase separator 172 is suitable for further processing, including removal of dissolved inorganic salts by conventional methods, such as by evaporation or reverse osmosis.

Solids remaining within gas/liquid phase separator 182 can settle and collect at bottom outlet 186. Such solids can include transition metals, heavy metals, rare earth metals oxides and metal carbonates, and insoluble inorganic salts. Solids collected within separator 182 are periodically removed from reaction system 110 through solids take-off line 200 and valve 202.

Reaction system 110 is constructed of suitable materials for exposure to the reaction mixture and to the effluent mixture. Examples of suitable materials for reaction system 110, except for tubular reactor 112, include stainless steel, etc. Examples of suitable materials of construction of tubular reactor 112 include Inconel 625, Hastelloy C-276, etc.

The maximum temperature reached within tubular reactor 112 can be determined from an energy balance along tubular reactor 112, beginning from inlet 114. The change in temperature of the reaction mixture as it passes through any portion of tubular reactor 112 is a function of the net rate of heat generation at that portion of tubular reactor 112. The net rate of heat generation at any portion of tubular reactor is defined as follows:

Net rate of heat generation=
   rate of heat introduction
   −rate of heat loss
   +rate of heat liberation by reaction At least a portion of inlet end 116 is heated. Throughout the heated portion of inlet end 116, the rate of heat introduction to the reaction mixture is greater than the rate of heat loss. Thus, the net rate of heat generation is positive and the temperature of the reaction mixture will increase. When the temperature of the reaction mixture is below 100° C., the rage of heat liberation by reaction is usually negligible and the net rate of heat generation is about equal to the rate of heat introduction. Above 250° C., the rate of heat liberation by reaction typically contributes significantly to the rate of temperature rise.

Once heating is terminated, there will be a finite heat loss from the reaction mixture to the surroundings. If the rate of heat liberation by reaction exceeds the rate of heat loss, then the temperature of the reaction mixture will continue to rise. On the other hand, if the reaction rate is not high enough to provide a sufficiently rapid heat liberation to compensate for heat loss, then the temperature of the reaction mixture decreases after heat introduction to the reaction mixture is terminated. For reaction mixtures containing 15 wt. % or more organic material, a temperature of at least 250° C. is generally preferred at the end of the heated portion of tubular reactor 112, so that the rate of reaction is sufficient to cause the reaction mixture temperature to increase further after leaving the heated portion.

Figure 4A:
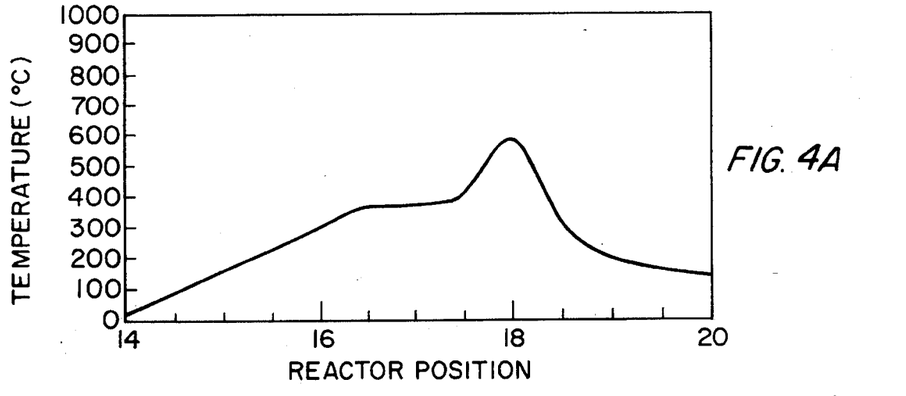
FIG. 4 is a series of plots (A, B, C) illustrating examples of temperature profiles along a tubular reactor, such as the one shown in FIG. 3, for reactions mixtures having different heating values.
Figure 4B:
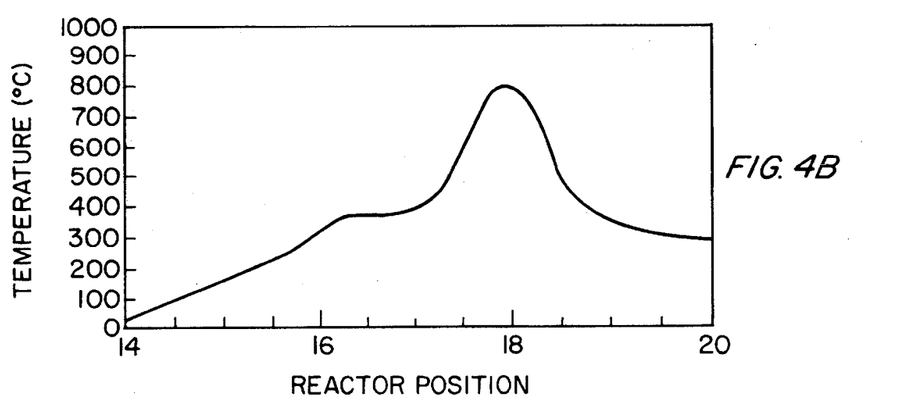

The maximum temperature reacted in tubular reactor 112 will depend, in part, upon the configuration of tubular reactor 112 at heating and cooling portions of tubular reactor 112, the amount of heat introduced in inlet end 116 and the heating value of the reaction mixture. For the configuration of tubular reactor 112, as shown in FIG. 3, a portion of tubular reactor 112 between wires 124, 126 and jacket 130 is unheated and insulated. For that configuration, FIG. 4 is a series of plots illustrating the temperature profiles for reaction mixtures having various heating values as those reaction mixtures pass through tubular reactor 112, shown in FIG. 3. For example, as shown in FIG. 4A, curve 188 represents a temperature profile for a reaction mixture having an intermediate heating value of about 800 Btu/lb. Curve 190, shown in FIG. 4B, represents a temperature profile for a reaction mixture, having a heating value of about 1500 Btu/lb, and exposed to the same operating conditions of system 110 as the reaction mixture having the temperature profile shown in FIG. 4A. Curve 192, shown in FIG. 4C, represents the temperature profile for a reaction mixture, having a heating value of about 200 Btu/lb, and which is exposed to the same operating conditions of system as the reaction mixtures having the temperature profiles shown in FIGS. 4A and 4B.

As shown in FIG. 4A, the reacting mixture is heated to 300° C. at the heated portion of inlet end 116. A maximum temperature of about 600° C. is reached, at which point between about 95% and about 99% of the organic material has been oxidized. Further oxidation of the organic material in the reaction mixture can take place at outlet end 118. However, the temperature of the reaction mixture falls when the rate of heat loss from the reaction mixture exceeds the rate of heat generation by reaction.

As can be seen in FIG. 4B, a reaction mixture having a heating value of about 1500 Btu/lb, reaches a higher peak temperature: about 800° C. The peak temperature in FIG. 4B is also reached more quickly than that in FIG. 4A, because the concentration of organic material in the reaction mixture represented by curve 190 is higher than that of the reaction mixture represented by curve 188. The higher concentration of organic material in the reaction mixture represented by curve 190 causes the reaction rate of that reaction mixture to accelerate faster than the reactor mixture represented by curve 188.

Figure 4C:
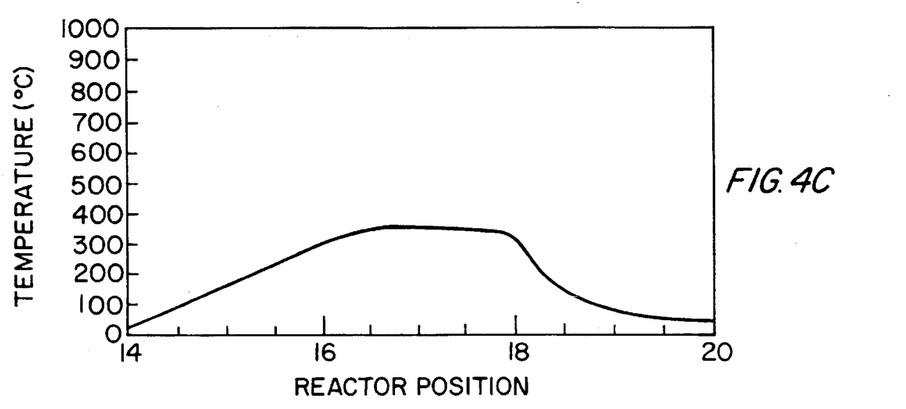

Curve 192, shown in FIG. 4C, represents a temperature profile of a reaction mixture which does not have sufficient heating value to reach temperatures above about 374° C., even when heated in the heated portion of inlet end 116 to a temperature of about 300° C. In such cases, the degree of oxidation generally does not exceed 80%, as has been found in the Zimmerman wet air oxidation process.

As shown in FIG. 4, the heating value of the reaction mixture and the amount of heat introduced at inlet end 116 determine the maximum temperature of the reaction mixture that can be reacted in tubular reactor 112. The maximum temperature that can be safely used is determined by the tensile strength of the reactor material. For example, where the material of construction of tubular reactor 112 includes Hasteloy C-276, which has excellent corrosion-resistance, the preferred maximum temperature is less than about 550° C. In another example, where the material of construction of tubular reactor 112 includes Inconel 625, which has good corrosion resistance, the preferred maximum operating temperature is less than about 650° C.

Figure 5A:
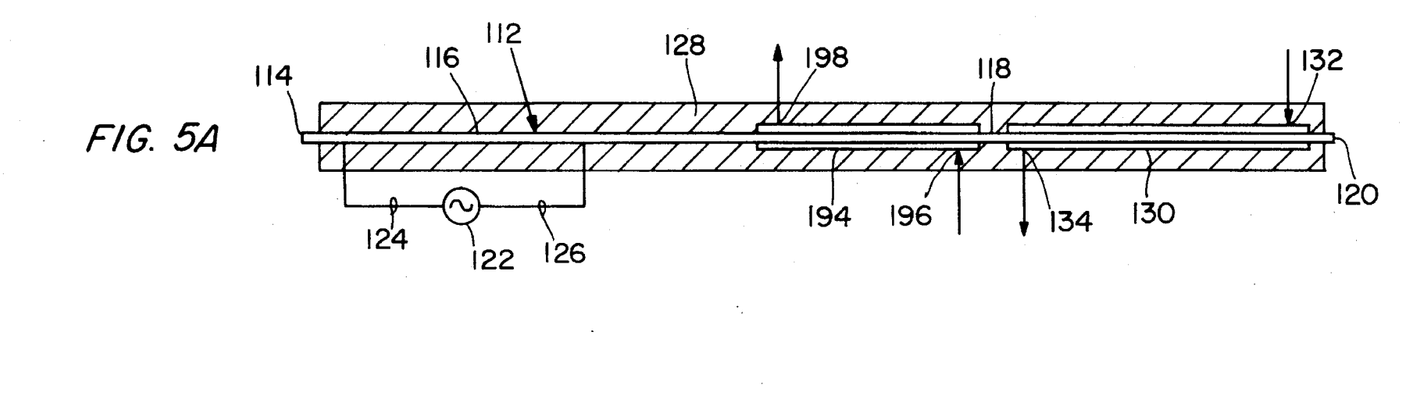
FIG. 5 is a series (A, B) of schematic representations illustrating different configurations for heating and cooling of tubular reactors for use as components of the apparatus shown in FIG. 1 and FIG. 2.
Figure 5B:
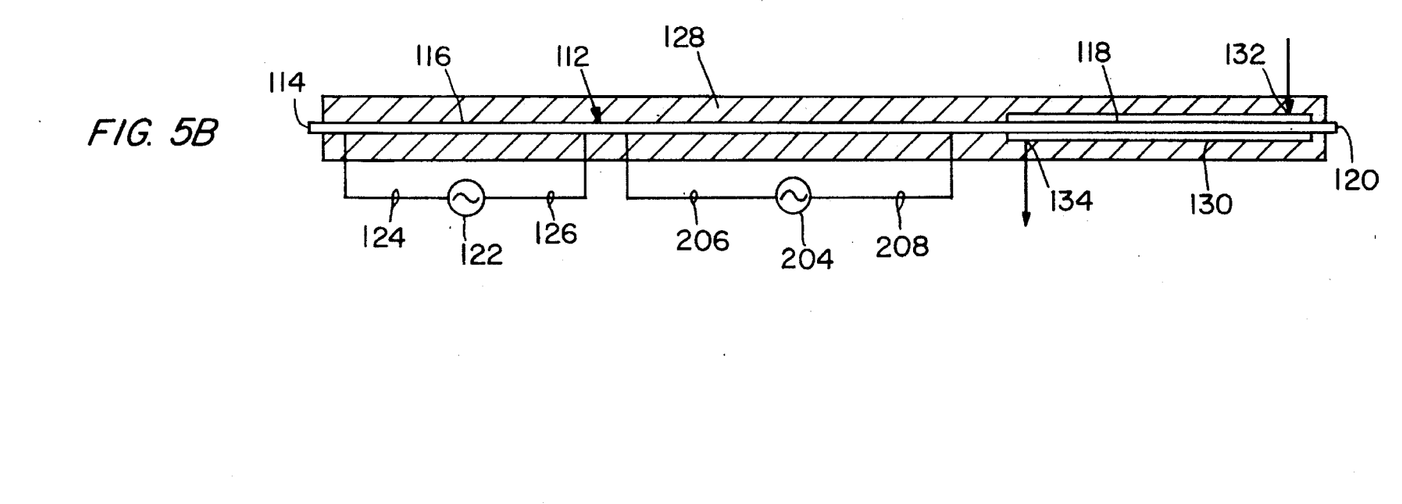

The reaction mixture having a heating value of about 1500 Btu/lb would exceed the maximum recommended temperature for Inconel 625, as shown in FIG. 4B. For reaction mixtures having such high heating values alternate reactor configurations are generally desirable. FIG. 5 schematically represents two such alternate tubular reactor configurations. For example, in FIG. 5A, jacket 194 is disposed at tubular reactor 112 at a point along the path of flow of the reaction mixture which precedes cooling jacket 130. Jacket 194 has an inlet 196 and an outlet 198. A suitable coolant, such as water at above the critical pressure is directed from water source 200 through inlet 196 and along tubular reactor 112 in a direction countercurrent to the direction of flow of the reaction mixture. The water can be converted to steam in heat exchanger 194. The water, either as a liquid or steam, is then discharged from heat exchanger 194 through outlet 198. Heat exchanger 194 allows a higher rate of heat loss from the reaction mixture, thereby keeping the maximum temperature of the reaction mixture below about 600° C.

For relatively dilute reaction mixtures, which have low heating value, such as below about 300 Btu/lb, additional organic material can be added to the reaction mixture to thereby increase the heating value of the reaction. Alternatively, other reactor configurations may be desirable to avoid the addition of fuel. For example, the reactor configuration shown in FIG. 5B can be employed to process a mixture with heating value of 300 Btu/lb or less. In this embodiment, electrical power source 204 is connected to tubular reactor 112 along the path of flow between wires 124,126 and cooling jacket 130 by wires 206,208. An electrical current is conducted through tubular reactor 112 by electrical power source 204 to thereby heat the reaction mixture to a temperature sufficient to oxidize a substantial portion of the organic material in the reaction mixture.

Figure 6A:
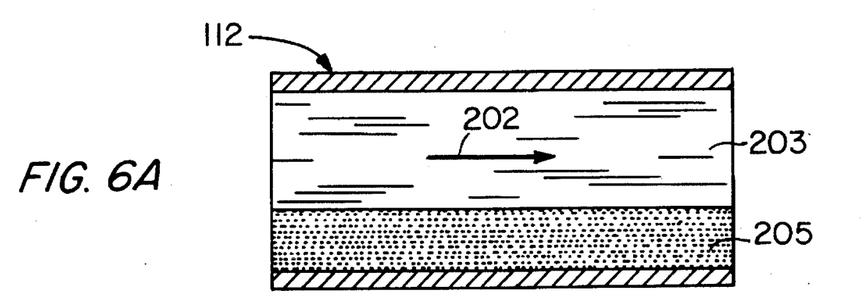
FIG. 6 is a series of drawings (A, B, C, D) illustrating patterns of flow of solid particles of the fluid in the tubular reactor.
Figure 6B:
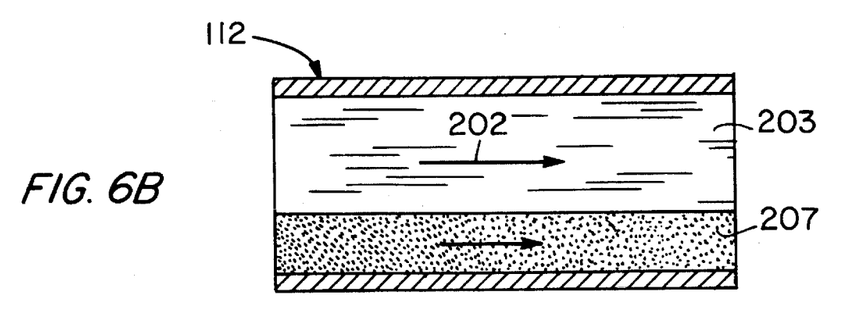
Figure 6C:
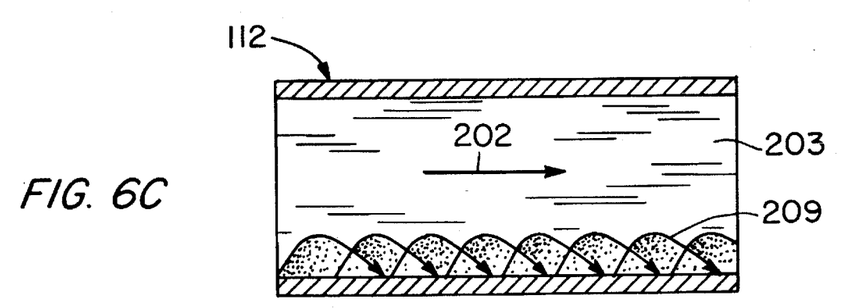
Figure 6D:
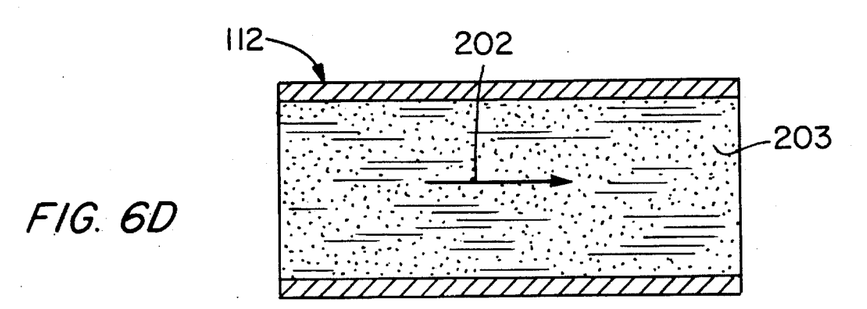

The velocity of flow of the reaction mixture through tubular reactor 112 is maintained at a rate which is sufficient to prevent settling of a substantial portion of solid particles within tubular reactor 112. FIG. 6 illustrates the pattern of solid particle flow through tubular reactor 112 under four different velocity regimes. The direction of fluid flow is indicated by arrow 202. For example, as can be seen in FIG. 6A, at relatively low fluid velocities, particles will settle out of reaction mixture 203 and a static bed 205 will form in tubular reactor 112. At higher velocities, a bed of solids can become a sliding bed 207 or saltating bed 209, as can be seen in FIGS. 6B and 6C, wherein the velocity of the solid particles is significantly less than that of the remainder of the reaction mixture. As velocity of the reaction mixture through tubular reactor 112 further increases, the solid particles will be suspended in the reaction mixture fluid and travel down the pipe at about the velocity of the reaction mixture, as can be seen in FIG. 6D.

Figure 7:
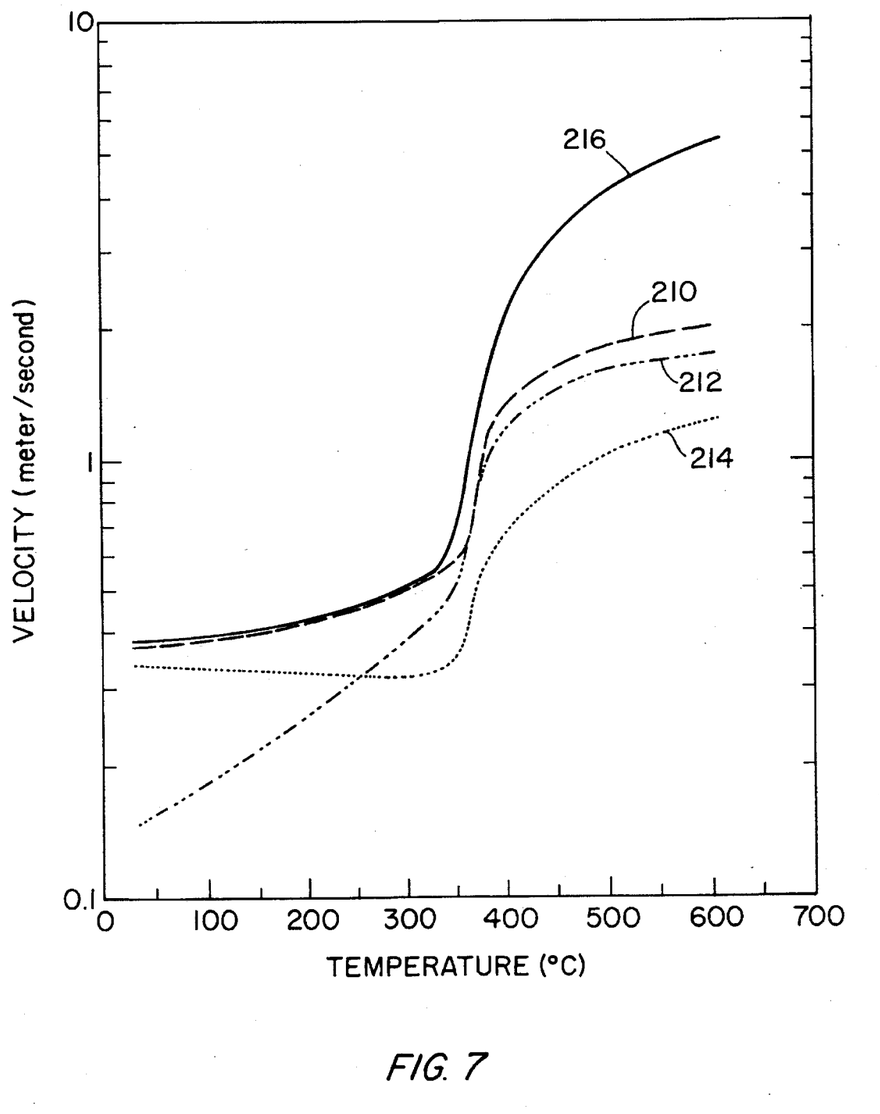
FIG. 7 is a series of plots illustrating variation of critical velocities with temperature for solid particle transport in a tubular reactor.

The velocity corresponding to the onset of each type of flow is called the "critical velocity" for that type of flow. The critical velocities are complex functions of particle size, particle density, particle concentration, pipe diameter, and fluid phase hydrodynamic properties (such as density and viscosity). Correlations have been published for the critical velocities of each type of flow pattern illustrated in FIG. 6. See, for example: Thomas, A.D. "Predicting the Deposit Velocity for Horizontal Turbulent Pipe Flow of Slurries," *Int. J. Multiphase Flow,* Vol. 5, 1979, pp. 113–129; Bragg. G. M. and Kwan, M. Y. M. "Prediction of Transport Velocities of Dust in Horizontal Ducts." Pneumotransport, Fourth International Conference on the Pneumatic Transport of Solids in Pipes, June 26–28, pp. C2-16 through C2-26; Davies, J. T. "Calculation of Critical Velocities to Maintain Solids in Suspension in Horizontal Pipes," *Chemical Engineering Science,* Vol. 42, No. 7, 1987, pp. 1667–1670. As an example, equations available in these references were used to calculate each of the critical velocities for a pipe having an inner diameter of 0.264 inches, particles having a diameter of 20 microns, and density of 2.7 gm/cm$^3$ and a concentration of about 1 wt. % in a liquid fluid. Fluid properties were estimated for a mixture of 9 wt. % organic, 1 wt. % inorganic, 90 wt. % water plus oxygen in 20% excess of stoichiometric. The fluid properties were estimated at 250 atmosphere and as functions of temperature from 25° to 600° C. The calculated critical velocities are shown in FIG. 7 as a function of temperature. Note that curve 200, which is a plot of the critical velocities for suspension flow, is higher than curves 212 and 214, which are plots of the critical velocities for sliding or saltating flow, respectively.

Curve 216, also shown in FIG. 7, is a plot of the velocity for a reaction mixture which is similar to the fluid represented by curves 210,212 and 214. The reaction mixture has a feed flowrate of about 830 g/min. The velocity of the reaction mixture varies down the tubular reactor as the inverse of fluid density. The velocity profile of curve 216 corresponds to the minimum mass flowrate for which the actual velocity will equal or exceed the critical velocities for suspension flow of solid particles anywhere in the tubular reactor where the solid particles have a diameter of about 20 microns and a density of about 2.7 g/cm$^3$. Note that the actual velocity for curve 311 varies from about 0.37 to about 5.5 meter/second (or about 1 to 17 feet/second).

Figure 8:
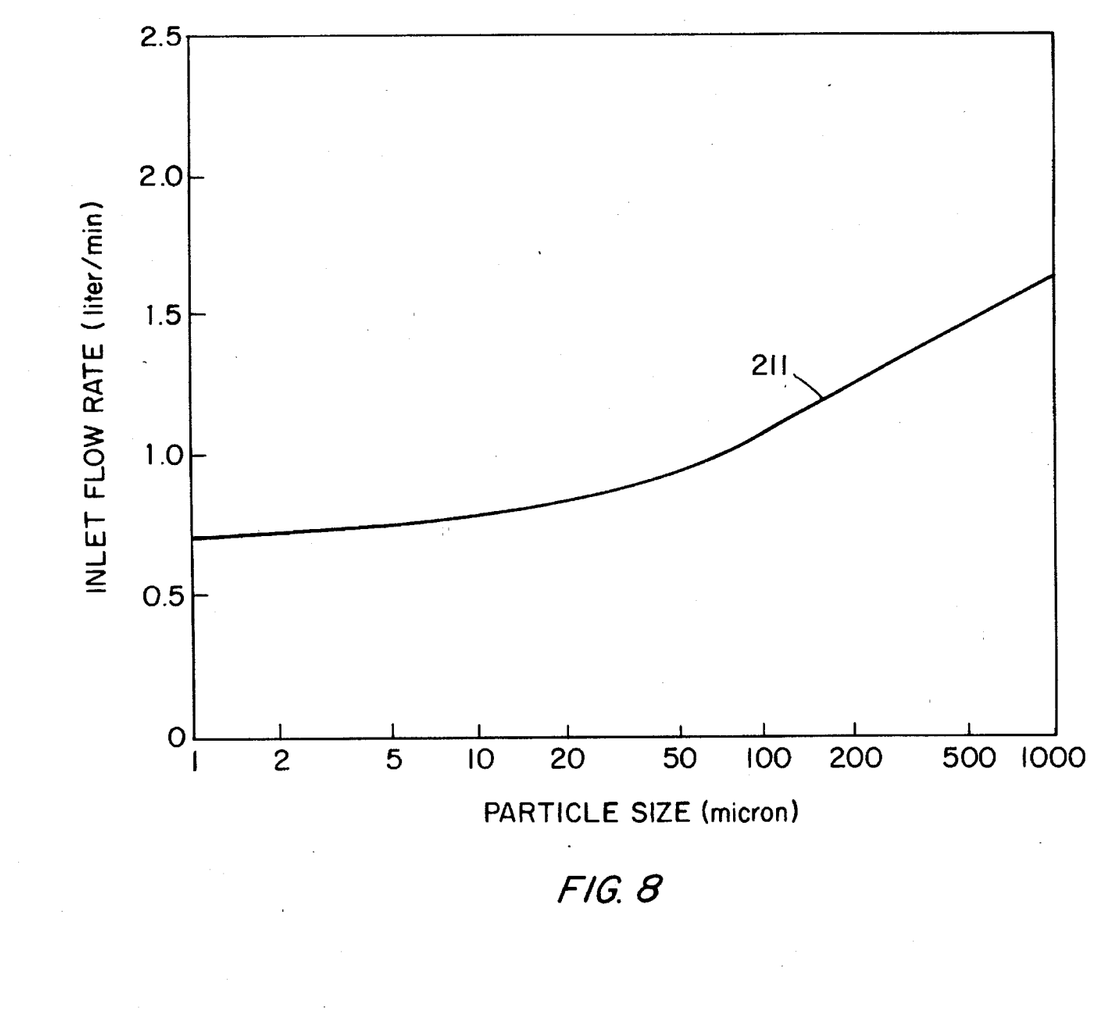
FIG. 8 is a plot illustrating variation of a minimum mass flowrate for suspension flow with respect to particle size in a liquid.

Curve 211, shown in FIG. 8, illustrates the variation of the minimum mass flowrate for a 0.264 inch i.d. tube as a function of particle diameter, for a particle density of 2.7 g/cm$^3$. Plots of the type shown in FIG. 8 are used as a guide to determine pipe diameter for a given reaction mixture mass flowrate and given maximum particle size in the feed. To account for inaccuracies in the critical velocity correlations and in estimates of reaction mixture properties, a design velocity of at least 20% higher than the minimum is preferred. If particle growth within tubular reactor 112 is anticipated, a higher contingency factor should be used.

Having so chosen the pipe diameter to satisfy the criterion for critical suspension flow, the reactor length is chosen to provide: (1) adequate surface area for heating and cooling the reaction mixture at inlet end 16 and outlet end 118, respectively, and (2) sufficient residence time to reach the desired degree of oxidation. Residence times in the range of between about five and about ten minutes are typically sufficient to reach oxidation of organic carbon in the range of between about 99% and about 99.9999% when the peak temperature is in the range of between about 550° and about 650° C. "Residence time," as that term is used herein, is defined as the volume of tubular reactor 112, divided by the volumetric flow rate of the reaction mixture at inlet 114 of tubular reactor 112.

When heating an aqueous solution containing certain inorganic salts, scale can build up on the wall of the heated surface. In addition, some organics can form a char when heated in water, which char can deposit along, and on, tubular reactor 112.

The invention will now be further and specifically described by the following examples. All parts and percentages are by weight unless otherwise specified.

Exemplification

Samples of pulp mill sludge having a 7.2% solids content were macerated using coarse an medium heads of a bench scale in-line wet macerator. The sludge samples were then diluted with deionized water and homogenized using a fine head on the macerator. The particle size of the sludge samples after maceration was less than 100 microns. The sludge samples were then diluted in water to 3.7% by weight.

The sludge samples were then separately fed to the reaction system illustrated in FIG. 3 and described in this example. Each sludge sample was pressurized to 3700 psi and fed to the tubular reactor. Two runs were conducted through the reaction system using the macerated pulp mill sludge. A third run was conducted employing a dioxin, 2,3,7,8-tetrachlorodibenzo dioxin (hereinafter "TCDD"), dissolved in a solvent containing 1.7% (by volume?) methyl ethyl ketone in deionized water to form a feed solution having a TCDD content of 0.5 ppm. Run conditions for the three runs is listed below in Table IV.

TABLE IV

| Run | Feed | Duration (hr) | Feed Flowrate (cc/min) | Oxygen Flowrate (SCFM) | Peak Reactor Temp. (°C.) |
|---|---|---|---|---|---|
| 1 | Sludge | 5.25 | 67 | 0.19 | 590 |
| 2 | Sludge | 6.8 | 71 | 0.19 | 574 |
| 3 | Dioxin | 2.3 | 52 | 0.19 | 574 |

The test results of the first two runs is shown below in Table V.

TABLE V

| ANALYTICAL TEST | RUN 1 | | | | RUN 2 | | | |
|---|---|---|---|---|---|---|---|---|
| | Sludge | Aqueous | Solids | Destruction (%) | Sludge | Aqueous | Solids | Destruction (%) |
| Total solids | 36,100 | NA | 4,300 | 88 | 43,900 | NA | 8,900 | 80 |
| 2,3,7,8-TCDD (pg/g) | 0.34 | 0.0031 | 1.9 | 96.7 | 123 | ND(.02) | 2.9 | 99.94 |
| 2,3,7,8-TCDF (pg/g) | 1.58 | ND(.0027) | 5.3 | >98.4 | 834 | ND(.01) | 25.8 | 99.87 |
| MAJOR ELEMENTS | | | | | | | | |
| Carbon | 12,043 | 27 | 18,500 | 99.1 | 18,382 | 16 | 11,000 | 99.3 |
| Oxygen | 11,545 | NA | 51,800 | 98.1 | 13,109 | NA | 35,800 | 97.6 |
| Hydrogen | 1,583 | NA | 10,250 | 97.2 | 1,664 | NA | 5,300 | 97.2 |
| CHO — SUBTOTALS | 25,151 | 27 | 80,550 | 98.5 | 31,134 | 16 | 51,900 | 98.5 |
| | Sludge | Aqueous | Solids | Recovery (%) | Sludge | Aqueous | Solids | Recovery (%) |
| MINOR ELEMENTS | | | | | | | | |
| Aluminum | 132 | 5 | 63,800 | 211 | 281 | 7 | 36,100 | 117 |
| Calcium | 678 | 258 | 29,500 | 55 | 474 | 480 | 8,380 | 108 |
| Chlorine | 329 | 188 | 248 | 55 | 206 | 210 | 125 | 97 |
| Iron | 25 | ND | 3,590 | 61 | 229 | 0 | 18,000 | 70 |
| Magnesium | 40 | 1 | 3,240 | 37 | 32 | 3 | 2,320 | 74 |
| Manganese | 20 | 1 | 1,440 | 34 | 6 | 0 | 355 | 86 |

TABLE V-continued

| ANALYTICAL TEST | RUN 1 | | | | RUN 2 | | | |
| --- | --- | --- | --- | --- | --- | --- | --- | --- |
| Nitrogen | 217 | 187 | 148 | 84 | 145 | 18 | 187 | 13 |
| Phosphorus | 17 | 1 | 10 | 8 | 25 | 1 | 188 | 10 |
| Potassium | ND | 8.7 | 2,270 | | ND | 12 | 1,900 | |
| Silicon | 40 | 73 | 196 | 181 | 74 | 160 | 867 | 218 |
| Sodium | 146 | 103 | 9,980 | 97 | 68 | 77 | 2,090 | 137 |
| Sulphur | 159 | 105 | 0 | 64 | 417 | 413 | 2 | 95 |
| MINOR — SUBTOTALS | 1,803 | 927 | 114,198 | 77 | 1,958 | 1,383 | 70,512 | 96 |
| Distribution | | 50% | 27% | | | 67% | 32% | |
| TRACE ELEMENTS | | | | | | | | |
| Arsenic | ND | 0.006 | ND | | 0.24 | 0.019 | 37 | 145 |
| Barium | 2 | 0.21 | 147 | 44 | ND | 0.06 | 210 | |
| Boron | ND | 0.31 | 1.6 | | ND | 0.22 | 1.4 | |
| Cadmium | ND | ND | 0.4 | | ND | 0.01 | 1.0 | |
| Chromium | 1.0 | 0.89 | 206 | 177 | 4.5 | 0.11 | 355 | 73 |
| Copper | 1.4 | 0.06 | 59 | 22 | 1.6 | 0.39 | 100 | 79 |
| Lead | ND | ND | 20 | | ND | ND | 27 | |
| Mercury | ND | ND | 0.60 | | 0.01 | 0.0023 | 0.70 | 84 |
| Nickel | 1.8 | 0.05 | 182 | 46 | 2.3 | 0.40 | 410 | 175 |
| Selenium | ND | ND | ND | | ND | 0.01 | 1.8 | |
| Silver | ND | ND | 1.1 | | 0.06 | ND | 2.1 | 23 |
| Strontium | 1.0 | 0.31 | 62 | 57 | 0.9 | 0.90 | 40 | 136 |
| Zinc | 5.8 | 0.26 | 294 | 26 | 7.2 | 0.55 | 488 | 68 |
| TRACE — SUBTOTALS | 13 | 2 | 975 | 48 | 17 | 3 | 1,674 | 104 |
| Distribution | | 16% | 33% | | | 15% | 89% | |

The concentration of total solids trace elements are shown in units of milligrams of element per kilograms of sludge, (i.e. wet basis), which is equivalent to parts per million by weight (ppm). TCDD and TCDF concentrations are shown in units of picograms per gram of sludge (wet basis), which is equivalent to parts per trillion (ppt). The analysis of major, minor and trace elements are presented on a dry basis.

The sludges of the first and second runs have solids contents of 3.6% and 4.4% by weight, respectively. The three major elements, carbon, hydrogen, and oxygen, account for more than 70% by weight of the sludge solids. The twelve minor elements account for an additional 5% and the thirteen trace elements account for about 0.5% of the sludge solids. The remaining 25% of the sludge solids are presumed to include about 80 elements which were not tested form. A gas chromatographic analysis of the gaseous effluent indicated the presence of only oxygen and carbon dioxide.

Destruction efficiency of the organic material fed to the reaction system is a measurement of the amount of elemental carbon, hydrogen or oxygen detected in a sample of solid effluent and aqueous effluent produced by the reaction system compared to the compounds which comprise the sludge samples introduced to the reaction system. As can be seen from Table V, the destruction efficiencies of carbon for both paper mill sludge samples was greater than 99%. The destruction efficiencies of oxygen and hydrogen of both paper mill sludge samples was greater than 97%.

Destruction efficiencies were also calculated for organic halides, TCDD and 2,3,7,8-tetrachlorobenzofuran (hereinafter "TCDF") of the sludge samples. Destruction efficiencies for TCDD and TCDF are also listed in Table IV. The combined destruction efficiency for organic halides in both sludge samples was 99.94%.

The destruction efficiencies of 2,3,7,8-TCDD and or organic carbon in the dioxin solution were also calculated based on the feed station and the aqueous and solid effluent. The destruction efficiency of the TCDD was 99.99995%.

The solid effluents of the paper mill sludge samples were leached with mild acids and the extract recovered and was analyzed for pollutants that might be leached out by, for example, acidic rainwater. The concentration of pollutants analyzed are listed below in Table VI.

TABLE VI

| Pollutant | Micrograms per liter of effluent |
| --- | --- |
| Arsenic | <5. |
| Benzene | 370. |
| Benzo(a)pryene | <2.5 |
| Bis(2-ethylhexyl)phthalate | 25. |
| Cadmium | 10. |
| Chlordane | <0.25 |
| Copper | 140. |
| DDT/DDE/DDD (total) | <7.5 |
| Lead | 80. |
| Lindane | <0.25 |
| Mercury | <.5 |
| Nickel | <50. |
| Polychlorinated biphenyls | <2.5 |
| Toxaphene | <0.25 |
| Trichloroethane | <1.9 |

With respect to aqueous effluent, the total concentrations of chlorine ( as chloride ion ), nitrogen ( as ammonia), sodium and sulfur (as sulfate) was about 0.1 weight percent.

With regard to the test results for the solution of TCDD in methyl ethyl ketone, the concentration of TCDD in the effluent was 264 picograms per liter of effluent. This was equivalent to a destruction efficiency of greater than 99.9999%. The total organic carbon destruction efficiency was about 99.9%, which was consistent with the values obtained for the two sludge samples.

Equivalents

Those skilled in the art will recognize, or be able to ascertain using no more than routine experimentation, many equivalents to specific embodiments of the invention described specifically herein. Such equivalents are intended to be encompassed in the scope of the following claims.

We claim:

1. A method for recovering wash water from effluent generated by a pulp and paper mill, comprising the steps of:
   a) filtering at least a portion of the effluent to form a filtrate stream and an organic solids feed stream;
   b) exposing the organic solids feed stream to a temperature and a pressure which are supercritical for water to cause a substantial portion of an organic solids component of said feed stream to oxidize and to form a product stream that, when cooled, includes a gaseous component, an inorganic solids component, and a liquid wash water component; and
   c) separating the wash water component from the gaseous and inorganic solids components, thereby recovering the wash water.

2. A method of claim 1 wherein the filtration includes ultrafiltration.

3. A method of claim 2 wherein at least a portion of the effluent is formed by caustic extraction in a pulp and paper mill.

4. A method of claim 2 wherein the filtration further includes reverse osmosis.

5. A method of claim 4 wherein at least a portion of the effluent is formed by bleaching in a pulp and paper mill.

6. A method of claim 4 further including the step of desalinating the wash water.

7. A method of claim 4 further including the steps of clarifying at least a portion of the effluent stream to form a clarified supernatant and an organic sludge, and thereafter exposing the organic sludge to a temperature and pressure which are supercritical for water to cause a substantial portion of an organic solids component of said organic sludge to oxidize and to form a product stream that, when cooled, includes a gaseous component, an inorganic solids component, and a liquid wash water component.

8. A method of claim 7 further including the step of dewatering the organic sludge.

9. A method of claim 7 further including the step of exposing at least a portion of the clarified supernatant to an activated sludge treatment to form a clarified liquid stream and a treated sludge.

10. A method of claim 9, further including the step of combining the treated sludge with the organic feed stream for subsequent exposure to a temperature and a pressure which are supercritical for water.

11. A method of claim 1 wherein the organic solids feed stream is exposed to a temperature and a pressure which are supercritical for water in an elongate tubular reactor having a substantially constant internal diameter from an inlet, of an inlet end of the tubular reactor, to an outlet, of an outlet end of the tubular reactor.

12. A method of claim 11 wherein exposure of the organic solids feed stream to a temperature and a pressure which are supercritical for water in the elongate tubular reactor includes the steps of:
   a) pressurizing the organic solids feed stream in the presence of inorganic material and a source of oxygen to form a pressurized reaction mixture, said pressurized reaction mixture having a pressure which is supercritical for water;
   b) passing the pressurized reaction mixture through said elongate tubular reactor at a velocity sufficient to prevent settling of a substantial portion of solid particles from the reaction mixture within the elongate tubular reactor;
   c) introducing sufficient heat to the pressurized reaction mixture in the elongate tubular reactor to cause a substantial portion of the organic material in the reaction mixture to oxidize, the temperature of the reaction mixture being elevated to at least the supercritical temperature for water;
   d) cooling the reaction mixture within the elongate tubular reactor, but at the outlet end of said elongate tubular reactor, to a temperature sufficient to cause formation of gas and liquid phases in the reaction mixture, the liquid phase including solid particles; and
   e) discharging the reaction mixture from the elongate tubular reactor at the outlet to thereby form an effluent mixture including solid particles, a liquid and a gas.

13. An apparatus for recovering wash water from effluent generated by a pulp and paper mill, comprising:
   a) filtration means for filtering at least a portion of the effluent to form a filtrate stream and an organic solids feed stream;
   b) a reactor for receiving the organic solids feed stream from the filtration means and for exposing the organic solids feed stream to a temperature and pressure which are supercritical for water, whereby a substantial portion of an organic solids component of said feed stream is oxidized to form a product stream that includes a gaseous component, an inorganic solids component, and a liquid wash water component; and
   c) separating means for separating the wash water component from the gaseous and inorganic solids components to thereby recover the wash water.

14. The apparatus of claim 13 wherein the filtration means includes a membrane filter.

15. The apparatus of claim 14 wherein the filtration means includes an ultrafiltration module.

16. The apparatus of claim 15 wherein the filtration means further includes a reverse osmosis module.

17. The apparatus of claim 16 wherein the separating means includes a reverse osmosis module.

18. The apparatus of claim 17 wherein the reactor is an elongate tubular reactor having an inlet, at an inlet end of the reactor, an outlet, at an outlet end of the reactor, and a substantially constant internal diameter from the inlet to the outlet.

19. The apparatus of claim 18, further including an external heat transfer means for transfer of heat from the organic solids feed stream at the outlet end of the elongate tubular reactor and for transferring heat removed therefrom to the organic solids feed stream at the inlet end of said elongate tubular reactor, thereby heating the organic solids feed stream at the inlet end of the elongate tubular reactor.

20. In a method for recovering wash water from effluent generated by a pulp and paper mill, said effluent being filtered by ultrafiltration and reverse osmosis to form an organic solids feed stream:
   the improvement comprising exposing the organic solids stream to a temperature and pressure which are supercritical for water, to cause a substantial portion of the organic solids to oxidize and form a product stream that, when cooled, includes a gaseous component, an inorganic component, and a liquid wash water component.

* * * * *